United States Patent Office 2,786,914
Patented Mar. 26, 1957

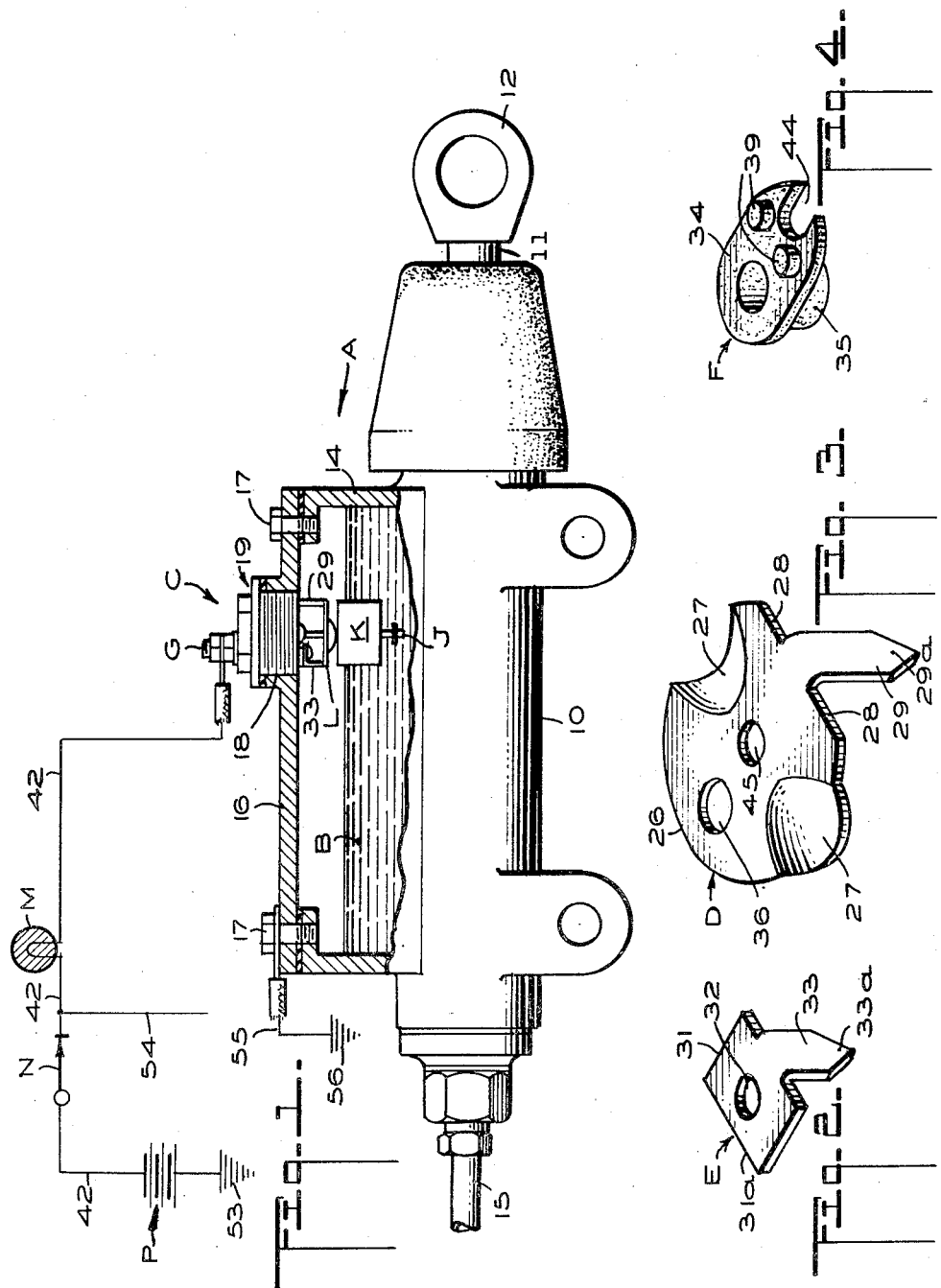

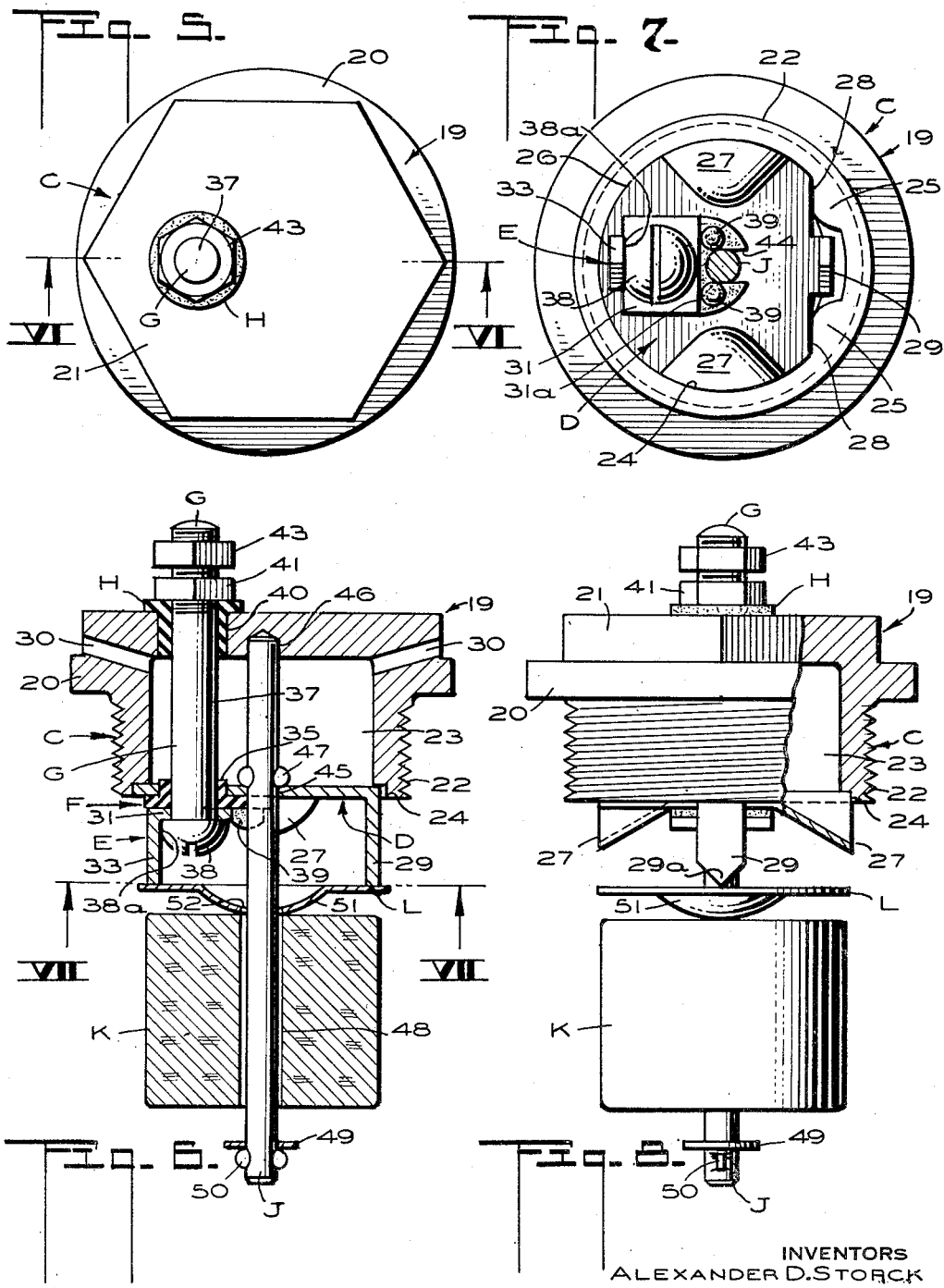

2,786,914

FLUID-LEVEL WARNING DEVICE FOR A MASTER CYLINDER

Alexander D. Storck and Hubert N. Divelbiss, Napa, Calif.

Application September 16, 1954, Serial No. 456,355

8 Claims. (Cl. 200—84)

The present invention relates to improvements in a fluid-level warning device for a master cylinder of a hydraulic brake system. It consists of the combinations, constructions, and arrangement of parts, as hereinafter described and claimed.

An object of our invention is to provide a float-controlled switch for a master cylinder, and an electrical circuit connected therewith, which will illuminate a light as soon as the ignition switch is turned on. As long as the light continues to glow, during operation of the vehicle, the driver will be assured of the fact that a safe amount of braking fluid is contained in the master cylinder. However, in the event that the fluid level should descend to a predetermined safe level, the float-controlled switch will open, resulting in putting out the light. Thus the absence of the burning light will indicate several possibilities to the driver: (1) the reservoir of the master cylinder requires refilling; (2) the light itself has burned out; (3) the electrical circuit no longer functions, for one reason or another, and should be checked; or (4) the brakes themselves or the lines leading thereto are leaking fluid.

The fluid level warning device comprises a simple automatic switch mechanism used in place of the conventional filler plug in the master cylinder of motor vehicles, and the switch is connected by appropriate wiring to a small green indicator light that is preferably placed on the dash board of the vehicle and near to the ignition switch.

Should the level in the master cylinder drop to say two-thirds of its capacity, the small green light will flicker, occasionally at first, then constantly as the fluid level gradually lowers still further. When the fluid level drops below the one-half mark in the master cylinder, the light will stop burning until additional brake fluid is added.

The flicker of the green light informs the driver that the brake fluid has dropped below the full mark and cautions him to add fluid soon. The failure of the green light to burn should be taken as a warning signal and brake fluid should be added. The main function of the device is to give visible assurance against accidents caused by faulty brakes due to lack of sufficient fluid in the master brake cylinder. Its use on motor vehicle will contribute a great deal toward lowering the high death rate and costly loss of property through highway accidents.

Other objects and advantages will appear as the specification continues. The novel features will be set forth in the claims hereunto appended.

*Drawings*

For a better understanding of the invention, reference should be had to the accompanying drawings, forming a part of this application, in which:

Figure 1 is a side elevational view of a master cylinder for a hydraulic brake system, disclosing our fluid-level warning device operatively applied thereto;

Figures 2, 3 and 4 are enlarged perspective views of different parts of the device;

Figure 5 is a top plan view of the device shown on an enlarged scale;

Figure 6 is a transverse section taken along the line VI—VI of Figure 5;

Figure 7 is a horizontal section taken along the line VII—VII of Figure 6; and

Figure 8 is a side elevation of the device with the device rotated 90° from the position shown in Figure 1.

While we have shown only the preferred form of our invention, it should be understood that various changes, or modifications, may be made within the scope of the annexed claims without departing from the spirit thereof.

*Detailed description*

Referring to the drawings, we have illustrated a conventional master cylinder, which is designated generally at A, in Figure 1, and adapted to be used in connection with a hydraulic brake system of a vehicle. This master cylinder provides a work cylinder 10 having a reciprocable piston rod 11 projecting therefrom for attachment to a foot brake by an eyelet 12 in the ordinary way. Moreover, a reservoir 14 is formed as a part of the master cylinder for holding braking fluid B, which serves to replenish the fluid in the work cylinder. When the piston rod 11 is pushed to the left in Figure 1, by depressing the foot brake, fluid is forced through a feed line 15 to the hydraulic brakes (not shown) to apply the latter. Upon moving the piston rod 11 to the right, the brakes will be released in the customary manner.

As shown in Figure 1, the reservoir 14 has a cover plate 16 secured thereto by cap screws 17. This plate is fashioned with a threaded bore 18, which serves as a filling opening for allowing braking fluid to be poured into the reservoir. Our combined filler cap and float-controlled switch unit is designated generally at C, and includes a metallic plug 19 adapted to be screwed into the bore 18 to close the latter.

The particular shape of the plug 19 is shown in Figures 5 to 8 inclusive. The plug has an outwardly extending annular flange 20, a hexagon head 21 projecting above the flange, and an outer threaded cylindrical portion 22 that depends from the flange and is removably received in the threaded bore 18 of the cover plate 16. The plug 19 is provided with a vent chamber 23 and the lower rim of the plug has an annular recess 24 for a purpose presently to be described. Figure 7 shows a bottom plan view of the plug 19 and the annular recess 24 is provided with two spaced apart projections 25 that are used to prevent the rotation of a baffle plate D.

In Figure 3, we show an enlarged perspective view of the baffle plate D. The plate is in the form of a disc that has a periphery 26 designed to be received in the annular recess 24 of the plug 19, see Figure 6. The plate also has diametrically opposed baffle portions 27, see Figures 3 and 8 and the purpose of these will be described hereinafter. The periphery 26 is cut away at two points 28—28 and an electric tongue-like terminal 29 is positioned between the aligned straight edges 28. Both Figures 3 and 8 indicate the terminal as having a V-shaped end so as to provide an electrical contact point 29a.

The baffle plate D when received in the annular recess 24 of the plug 19, is arranged so that the straight edges 28—28, will abut the two projections 25, and thus the baffle plate is held from rotating with respect to the plug 19. The baffle plate closes the vent chamber 23 with the exception of the air that can enter or leave the chamber through the passages provided by the baffles 27, see Figure 8. At the top of the vent chamber 23, we provide drilled vent holes 30 that open to the atmosphere preferably at the juncture between the flange 20 and certain sides of the hexagon head 21.

Before describing how the baffle plate D is secured to the plug 19, it is best first to describe the parts associated with the baffle plate. An electrode or second electrical contact E is shown in perspective in Figure 2. This contact or terminal has a rectangular base 31 provided with an opening 32, and a contact tongue-like member 33 extends from the base 31 at right angles thereto. The terminal 33 has a V-shaped end that forms an electrical contact point 33a. The point 33a lies in the same plane as the point 29a.

The electrical contact E is secured to, but insulated from the baffle plate D by an insulating washer F of the shape shown in Figure 4. The washer F is entirely made of insulating material and is provided with a base 34 that bears against the outer surface of the baffle plate D, see Figure 6. The washer F has an integral, sleeve-like bushing 35 that is passed through an opening 36 in the baffle plate and in this way the electrical contact E is electrically insulated from the baffle plate. A round headed bolt G has its shank 37 extending through the bushing 35 and the head 38 of the bolt contacts with the base 31 of the contact E. The head 38 has a flat portion 38a, see Figure 7, that contacts with the inner surface of the depending contact 33. It will also be noted that an edge 31a of the base 31 on the contact E, engages with two projections or bosses 39 formed on the insulating washer F, and these projections plus the flat portion 38a on the bolt head 38, prevent rotation of the contact E. The bolt is also held from rotating by this manner of fastening.

Figure 6 shows the bolt shank 37 extending through an opening 40 in the plug 19 and the shank is insulated from the plug by a flanged, bushing-type insulator H. A nut 41 is mounted on the threaded portion of the shank 37 and contacts with the insulator H to secure the bolt in place. The shank 37 also acts as a binding post for an electric wire 42, see Figure 1, and a second nut secures the wire to the shank 37 and binds it against the nut 41.

It will be seen from Figure 7, that the insulating washer F has a recess 44 in its base 34 that receives a guide pin J. The pin extends through a central opening 45 in the baffle plate D and therefore the guide pin J, prevents the insulating washer F, from rotating, and the washer in turn, holds the electrical contact E from rotating about the shank 37 or the bolt G. The flat head 38a on the bolt head in contacting with the terminal 33 on the contact E, is held from rotating and therefore the bolt cannot rotate.

The top of the guide pin J is received in a recess 46, formed in the top of the vent chamber 23 in the plug 19. The pin has upset portions 47 that bear against the upper surface of the baffle plate D. These upset portions 47 and the recess 46 cooperate to hold the pin from moving in the direction of its length. The pin is prevented from moving laterally in the plug, by an edge of the opening 45 in the baffle plate D bearing against the pin, and by the wall of the recess 46 in the plug 19. In this way the guide pin J is anchored to the plug 19 when the bolt G is secured in place.

It will be noted from Figure 6, that a float K has a bore 48 that loosely receives the portion of the guide pin J that extends below the baffle plate D. The float may be a hollow body or made of a buoyant material such as cork. A washer 49 is mounted on the guide pin J at a point below the float K and the washer rests on upset portions 50, disposed adjacent to the lower end of the pin. When the float K is not supported by the liquid B in the reservoir 14, see Figure 1, it will rest on the washer 49 and is a part of the switch structure carried by the plug 19.

Between the top of the float K and the baffle plate D, we mount a crowned contact washer L. The washer is in the shape of a metal disc that has a central semi-spherical shaped depressed portion 51 which surrounds a center opening 52 in the disc. The opening 52 slidably receives the guide rod J and is free to slide and wobble on the rod. In Figure 6, the float is shown lifted above the bottom washer 49, and holding the contact washer L, against the pointed ends 29a and 33a of the downwardly extending electric terminals 29 and 33, respectively. The depressed bowl-shaped portion 51 of the contact washer L, rests on the top of the float K and the construction is such that the float can wobble, as it moves on the guide rod and still the contact washer L will be held in steady contact with both terminals 29 and 33, so long as the fluid supports the float. This permits the fluid in the reservoir to surge back and forth as the vehicle moves over uneven ground, and yet the contact washer L will remain in firm contact with both of the terminals during the entire time.

Referring to Figure 1, it will be seen that the wire 42, leads from the bolt G to a green light M, and thence to an ignition switch N, a battery P, and ground 53. A wire 54, leads to the ignition circuit of the vehicle engine, not shown, and if desired, the master cylinder A can have a wire 55, leading to ground 56.

From the foregoing description of the various parts of the device, the operation thereof may be readily understood. The plug 19 carries all of the automatic switch elements heretofore mentioned and it takes the place of the usual filler plug in the master cylinder. Our plug can be attached to or removed from the master cylinder with the same ease as the conventional filler plug. When the plug 19 is attached to the master cylinder and the wiring connected to the green light M and the battery P in the manner shown in Figure 1, the device is ready for automatic operation.

If the reservoir 14 has a sufficient quantity of brake fluid therein, the light M will be lighted as soon as the ignition switch is closed. This is due to the fact that the crowned contact disc L will bridge the terminals 29 and 33 and therefore an electric circuit will be closed from the battery P, through the ignition switch N, and the light M, and then to the bolt G which is insulated from the plug 19 by the washers F and H. The terminal 33 is in electric contact with the bolt G, and therefore the current will flow through this contact, and then through the disc L to the contact 29. The latter contact 29 is electrically connected to the plug 19 and therefore the current will flow to ground 56, and from ground 53, back to the battery P, to complete the circuit.

Should the level of the brake fluid B drop to a predetermined point, the float K will cease to hold the contact disc or washer L, firmly against the two contacts 29 and 33. The disc L, and terminals 29 and 33, constitute an automatic switch in series with the green light M. When the automatic switch opens and closes, caused by the lowered level of the fluid and by its surging in the reservoir 14, the green light M will flicker and will warn the driver to replenish the master cylinder A with brake fluid. When the level of the fluid B, drops still lower, the light M will go out. This means that brake fluid must be added at once for safety stake.

The baffle plate D fulfills several functions. In the first place, it holds the guide pin J in place. Then it acts as an electrical conductor and supports the terminal 29 which is integral therewith. Besides this, the baffle plate prevents the brake fluid from being pumped out the breather openings 30 during the actuation of the brake. The baffle portions 27 on the plate D, prevent too much brake fluid from surging into the vent chamber 23, while permitting air to pass into and out of the chamber. The capacity of the vent chamber 23 is large enough to receive what little brake fluid might pass the baffles 27 and still prevent this fluid from passing out through the vents 30.

The insulating washer F does more than insulate the terminal 33 from the baffle plate D. The washer is held against turning by having its recess 44 receive the guide pin J, and the washer in turn holds the terminal 33 from turning by having the rectangular base 31 of the washer, contact the bosses 39 and thus be held from rotating. The terminal 33 then holds the bolt G from rotating. All of the parts are secured to the plug 19 by the single bolt G which also acts as a binding post for the wire 42.

The float K bears against the depressed crown portion 51 of the disc L, allowing the float to move sideways without breaking the contact with the terminals 29 and 33. The baffle plate D is also a grounded electrode carrying plate. The projections 25 in the groove 24 in the plug 19, prevent the plate D from rotating in the groove. This positions the terminal 29 at the desired point with respect to the plug 19. The float K has a loose fit on the guide pin J so as not to get hung up as the vehicle moves over uneven ground. The washer 49 prevents the float from becoming separated from the guide pin J when the plug is removed from the master cylinder A. The upset portions 50 prevent the washer 49 from slipping off the guide pin J.

We claim:

1. In a combined filler cap and float-controlled automatic switch unit: a plug adapted to form a closure for a filling bore which leads to a reservoir of a master cylinder; said plug having a cavity opening toward the reservoir and constituting a vent chamber; said plug having bleed holes placing the top of the vent chamber in communication with the atmosphere; a guide rod depending from the plug and extending into the reservoir; a baffle plate closing the greater part of the bottom of the vent chamber and having baffle portions for permitting the air to pulsate between the vent chamber and the reservoir and reducing any flow of brake fluid into the chamber to a point where none will escape through the bleed holes; a float slidable on the rod and of a size to pass through the filling bore; a pair of electric contacts extending downwardly from the plug and arranged on opposite sides of the guide rod; and a metallic disc movable on the guide rod and having a depressed, bowl-like portion rockably supported on top of the float; said disc being adapted to bridge the two contacts when the disc is lifted by the float and the bowl-like portion permitting the disc to rock on the float if necessary when lifted into engagement with the two contacts.

2. In a combined filler cap and float-controlled automatic switch unit: a plug adapted to form a closure for a filling bore which leads to a reservoir of a master cylinder; a guide rod fixed to the plug and adapted to extend into the reservoir; a float designed to pass through the filling bore and disposed in the reservoir, and being mounted for up and down movement on the guide rod in response to the change in the level of the braking fluid in the reservoir; a metallic disc movable on the guide rod and having a depressed, bowl-like portion resting on top of the float; and a pair of electric contacts arranged on opposite sides of the guide rod and depending from the plug and adapted to be contacted by the disc when the latter is raised by the float; the depressed, bowl-like portion of the disc permitting a relative rocking movement to take place between the disc and the float top so that the bowl-like portion of the disk can rock on the float if necessary as the float lifts the disc and causes the latter to be moved into engagement with both contacts.

3. In a combined filler cap and float-controlled automatic switch unit: a plug adapted to form a closure for a filling bore which leads to a reservoir of a master cylinder; said plug having a cavity opening toward the reservoir and constituting a vent chamber; said plug having bleed holes placing the top of the vent chamber in communication with the atmosphere; a baffle plate closing the greater part of the bottom of the vent chamber and having baffle portions for permitting the air to pulsate between the vent chamber and the reservoir, but preventing the passage of sufficient fluid from the reservoir into the vent chamber for any to escape through the bleed holes; a guide rod having one end anchored to the plug; said baffle plate having an opening through which the rod extends; means on the rod and contacting with the side of the baffle plate facing the vent chamber for holding the rod from longitudinal movement; a fastening bolt for securing the baffle plate to the plug; and a float slidable on the rod portion extending beyond the baffle plate.

4. A device including the combination of claim 3: and in which the bolt is insulated from the baffle plate and the plug and extends above the plug top to constitute an electric binding post for a wire; an integral electric terminal depending from the baffle plate; a second electric terminal secured in place by the bolt, but insulated from the bolt and baffle plate; and a metal disc slidable on the rod and movable by the float into electrical contact with the two terminals.

5. In a combined filler cap and float-controlled automatic switch unit: a plug adapted to form a closure for a filling bore which leads to a reservoir of a master cylinder; a first metal disc carried by the plug and having a central opening therein; a guide rod having an end anchored to the plug, said rod extending through the opening in the disc; a bolt extending through the disc and connected to the plug for securing the disc thereto; an insulating washer having a sleeve insulating the bolt from the disc and having a recess for receiving the guide rod for preventing rotation of the washer; an electric terminal having a base bearing against the washer for insulating the terminal from the disc; said bolt securing the terminal to the washer; said washer having projections contacting the base of the terminal for preventing rotation of the latter; said disc having an integral electric terminal; a float slidable on the portion of the guide rod extending beyond the disc; and a second metal disc slidable on the guide rod and being placed between the float and first disc; said second disc being movable by the float into electrical contact with the two terminals.

6. A device as set forth in claim 5: and in which the second disc has a depressed bowl-like portion resting on the top of the float and permitting relative rocking movement between the float and second disc for holding the latter in contact with the two terminals while the float is moved transversely due to any movement of the brake fluid in the reservoir.

7. A device as set forth in claim 5: and in which the bolt has a head with a flattened surface that contacts with a side of the first-mentioned terminal for preventing rotation of the bolt; said bolt being insulated from the plug; and a pair of nuts threaded on the bolt for holding it to the plug and for receiving an electric wire therebetween.

8. In combination: a reservoir for holding brake fluid; a float-controlled automatic switch unit for the reservoir and including a fixed guide rod extending into the reservoir; a float slidable on the rod and being raised or lowered by the change in fluid level; a pair of electric contacts disposed within the reservoir and above the float and being arranged on opposite sides of the guide rod; and a metallic disc movable on the guide rod and having a depressed bowl-like portion rockably supported on top of the float; said disc being adapted to bridge the two contacts when the disc is lifted by the float, the bowl-like portion permitting the disc to rock on the float if necessary when lifted into engagement with the two contacts for closing the switch.

References Cited in the file of this patent

UNITED STATES PATENTS

| | | |
|---|---|---|
| 2,253,260 | Alcorn | Aug. 19, 1941 |
| 2,494,802 | Fox | Jan. 17, 1950 |
| 2,615,105 | Whitney | Oct. 21, 1952 |
| 2,680,169 | Capuano | June 1, 1954 |
| 2,684,414 | Kilpatrick | July 20, 1954 |